(12) United States Patent
Marquez et al.

(10) Patent No.: US 6,786,652 B2
(45) Date of Patent: Sep. 7, 2004

(54) PROCESS FOR FABRICATING A PHOTONICS PACKAGE AND FOR ALIGNING AN OPTICAL FIBER WITH A PHOTODETECTOR SURFACE DURING FABRICATION OF SUCH A PACKAGE

(75) Inventors: Christian L. Marquez, Redondo Beach, CA (US); James A. Hathaway, Rancho Palos Verdes, CA (US); Michelle M. Hazard, Huntington Beach, CA (US); Dean Tran, Westminster, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 110 days.

(21) Appl. No.: 10/027,941

(22) Filed: Dec. 19, 2001

(65) Prior Publication Data

US 2003/0113075 A1 Jun. 19, 2003

(51) Int. Cl.⁷ .................................................. G02B 6/36
(52) U.S. Cl. .......................................... 385/92; 385/94
(58) Field of Search ....................... 385/78–85, 90–94, 385/138

(56) References Cited

U.S. PATENT DOCUMENTS

| | | | | |
|---|---|---|---|---|
| 4,357,072 A | * | 11/1982 | Goodfellow et al. | 385/91 |
| 4,699,456 A | * | 10/1987 | Mackenzie | 385/94 |
| 4,707,066 A | * | 11/1987 | Falkenstein et al. | 385/138 |
| 4,927,228 A | * | 5/1990 | Van De Pas | 385/90 |
| 6,234,688 B1 | * | 5/2001 | Boger et al. | 385/92 |
| 6,409,398 B2 | * | 6/2002 | Nakaya et al. | 385/93 |
| 6,524,018 B2 | * | 2/2003 | Wang et al. | 385/92 |

\* cited by examiner

*Primary Examiner*—Jay Patidar
(74) *Attorney, Agent, or Firm*—Jones, Tullar & Cooper PC

(57) ABSTRACT

A process for fabricating a photonics package includes securing a ferrule to an optical fiber, inserting the ferrule through a movable flange into a photonics housing containing a photodiode, adjusting the ferrule longitudinally within the flange to position the end of the optical fiber with respect to the surface of the photodiode and welding the ferrule to the flange. Thereafter, the ferrule and flange assembly is adjusted laterally with respect to the photodiode and the lower end of the flange is secured to the housing using hot gas injection or laser soldering which allows lateral adjustment of the fiber during the solder cooling process for final positioning with respect to the photodiode.

7 Claims, 2 Drawing Sheets

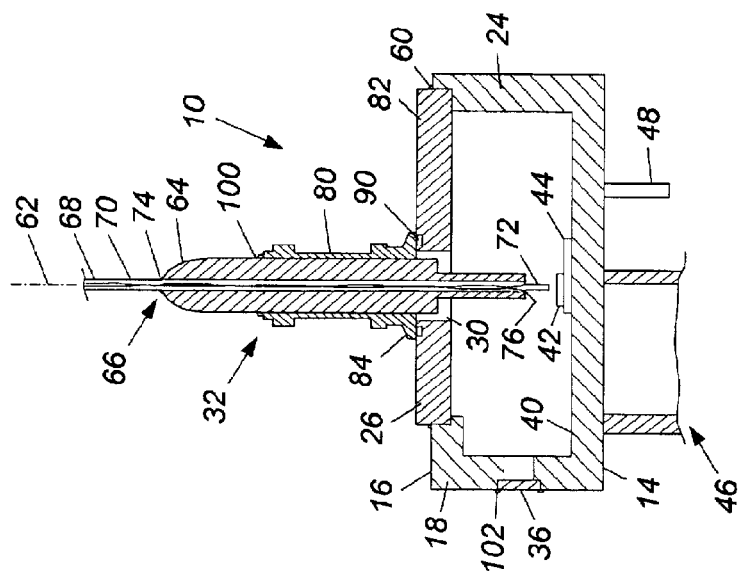
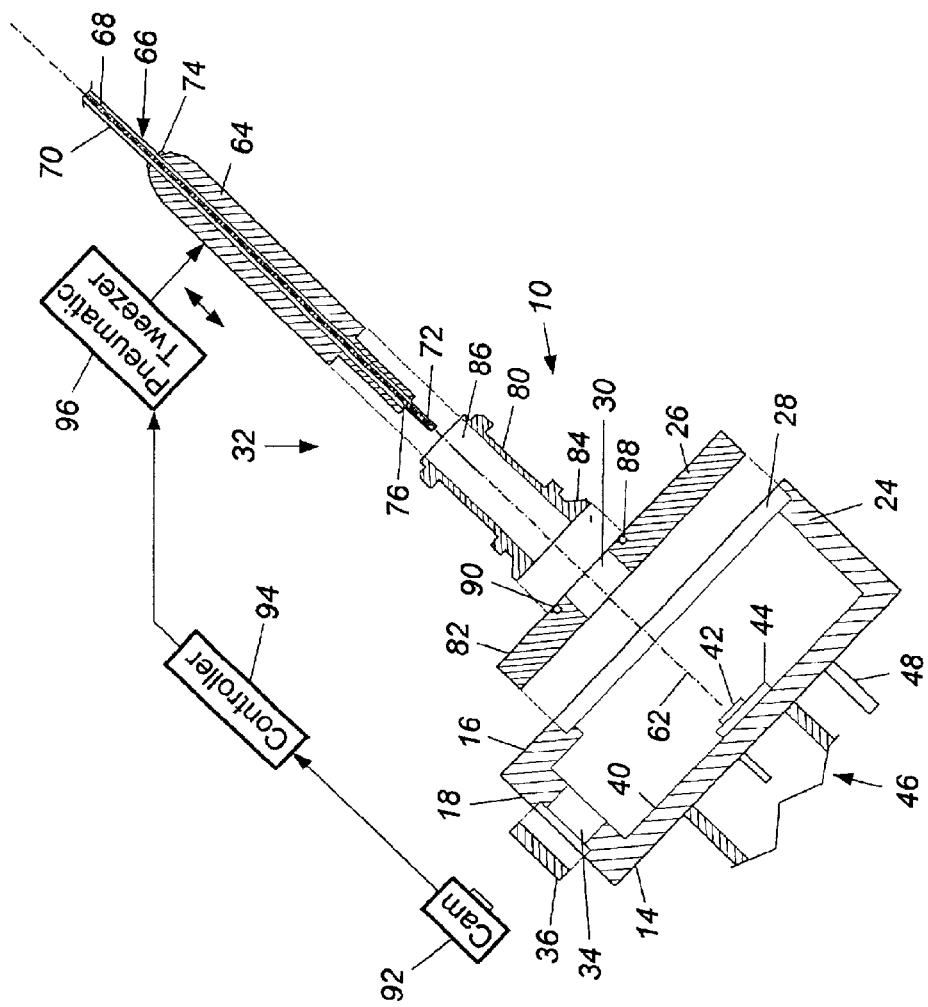

PROCESS FOR FABRICATING A PHOTONICS PACKAGE AND FOR ALIGNING AN OPTICAL FIBER WITH A PHOTODETECTOR SURFACE DURING FABRICATION OF SUCH A PACKAGE

BACKGROUND OF THE INVENTION

The present invention relates, in general, to a process for fabricating optical packages, and more particularly to a process for aligning an optical fiber with a photodetector surface in a housing during fabrication of the package.

In optical fiber systems, where data may be transmitted by optical energy such as laser light which travels through the fiber, the fiber typically terminates in a photonics device such as a receiver, transponder, transceiver, or the like, where optical signals are received and converted to corresponding electrical signals. Typical photonics packages include a radio frequency (RF) chip mounted on one platform, or carrier block, and a photodetector mounted on another platform, or carrier block, using standard die attachment techniques in each case. The two carrier blocks are interconnected at right angles to each other, for example, with the photodetector block including a thick film connection line for interconnecting the photodetector and the RF chip. Alternatively, the photodetector and the RF chip can be interconnected by a ribbon or wire bond. The optical fiber output end then is aligned with the photodetector to permit the transfer of optical energy from the fiber to the photodetector.

It has been found that in such optical packages, RF interconnection losses between the photodetector and the RF circuitry are unacceptably high, due in part to signal losses in the finite lengths of the bonded ribbon connectors used to electrically connect the photodetector to the RF circuitry. In addition, it has been found that in these prior photonics packages, an accurate alignment of the optical fiber and the photodetector is difficult, and this increases the potential for signal losses.

More particularly, an accurate alignment of an optical fiber with its target photodetector is necessary to maximize the illumination of the photodetector by optical energy from the output of the optical fiber. Typically, such alignment has been accomplished by placing a metallic shield on the optical fiber, clamping the shielded fiber to the surface of a chip carrier, or to a housing wall on which the carrier is mounted, and then positioning the fiber, using pneumatic tweezers, to direct the optical energy output from the fiber onto the photodetector. A major problem with this method is that after the fiber has been optimally positioned by the tweezers, the clamp must be welded to the carrier or housing wall to secure the fiber in place. It has been found that welding the clamp can cause movement of the fiber, however, resulting in optical misalignment of the photodetector and the fiber. When this occurs, it is difficult to realign the fiber with the photodetector, and a permanent loss of signal through the optical package can result.

Accordingly, there is a need for an improved photonics package, in which a photodetector and RF circuitry connected thereto are located on the same housing surface, as well as a need for an improved technique for fabricating the photonics package which permits better optical alignment of the photodetector and an input optical fiber.

SUMMARY OF THE INVENTION

In accordance with a preferred form of the invention, an optical package is fabricated by positioning an optical fiber in the wall of a housing, aligning it with a photodetector mounted in the housing, and adjusting the position of the fiber as it is secured to the housing in such a way as to ensure accurate alignment and the resulting maximum illumination of the photodetector by light energy from the fiber. The process of the invention allows the use of a monolithic integrated circuit chip that contains both a photodetector and the RF circuitry used with the photodetector, since the alignment technique of the invention does not require mounting of the optical fiber on the RF chip carrier. Further, the method of the invention allows the fiber to be aligned accurately with the small photosensitive surface of the photodetector chip, and to maintain its alignment while the fiber is secured to the housing. The method not only ensures maximum illumination, but by using an integrated circuit it minimizes RF losses between the photodetector and the RF circuitry.

In greater detail, in a preferred embodiment of the invention, a housing, which is used in the formation of an optical package, includes a back wall for receiving a photodiode and corresponding RF circuitry, which components may be mounted, for example, as a single "monolithic millimeter integrated circuit" (MMIC) chip secured to the wall. A housing front wall, which may be generally parallel to and spaced from the back wall, includes a first aperture positioned to be generally opposite to the photodetector. The aperture is closed by a first closure, or lid, and an optical fiber assembly is adjustably secured to the lid. A top housing wall, extending between and hermetically sealed to the front and back walls, includes a second, or viewing, aperture for providing access to the interior of the housing and a second lid, or closure, is provided to seal this aperture. Side and bottom walls hermetically sealed to the front, back and top walls complete the housing enclosure.

To fabricate the photonics package of the present embodiment, the MMIC chip is mounted in the housing, and the first closure is secured to the front wall of the housing. This first closure includes a fiber alignment window which is generally aligned with the photosensitive surface onto which optical signals are to be directed. An end portion of a jacketed optical fiber which is to supply optical signals to the photodetector preferably is hermetically sealed in a coaxial, elongated ferrule, with the free, or distal, end of the fiber extending beyond the ferrule. The ferrule is then inserted into a coaxial flange to form an optical fiber assembly. This assembly is positioned in the fiber alignment window, and the distal end of the fiber is accurately aligned with the photodetector surface for maximum coupling efficiency, preferably by the use of an active automatic control system through an adjustable holding mechanism such as pneumatic tweezers.

After the optical fiber has been positioned, the ferrule surrounding the fiber is secured to the coaxial flange, as by a ring weld, hermetically sealing the joint between the flange and the ferrule. Thereafter, the flange is secured over the fiber alignment window via welding. A relatively slow-setting sealant, such as solder, can be used to provide a hermetic seal. While the sealant is setting, and is still fluid, the fiber is realigned, as needed, by the adjustable holding mechanism. As the sealant sets, the fiber is reliably and accurately aligned with the photodetector by this process, assuring maximum light signal coupling. Finally, the closure for the viewing aperture is sealed in place, to complete the improved, hermetically sealed photonics package in accordance with the present invention.

BRIEF DESCRIPTION OF DRAWINGS

The foregoing, and additional objects, features and advantages of the present invention will become apparent to those of skill in the art from the following detailed description of a preferred embodiment thereof, taken in conjunction with the accompanying drawings, in which:

FIG. 3 is an exploded cross-sectional view, taken along lines 2—2 of FIG. 1; and FIG. 4 is a cross-sectional view of the assembled package of the invention, also taken along lines 2—2 of FIG. 1.

DETAILED DESCRIPTION OF THE APPLICATION

Figure 2:
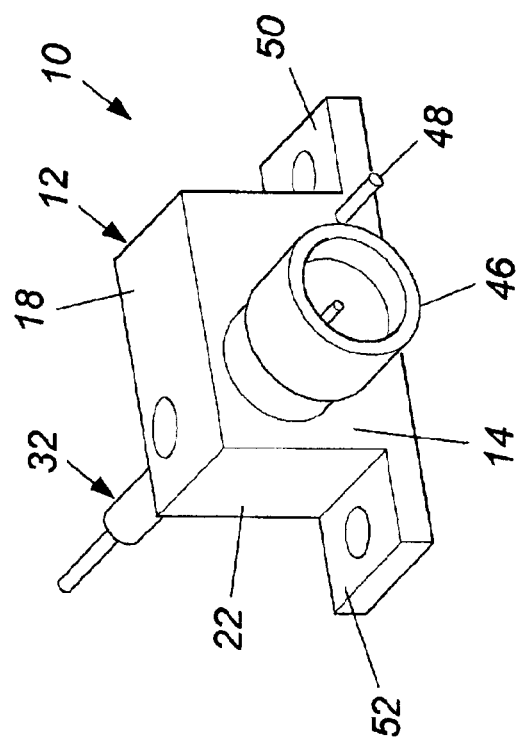
FIGS. 1 and 2 are front and rear perspective views respectively, of a completed photonics package, fabricated in accordance with the present invention.
Figure 1:
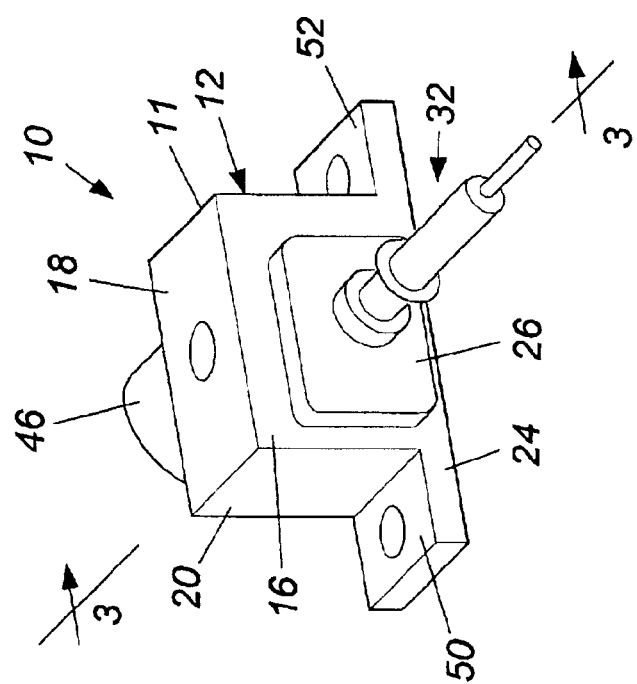

Turning now to a more detailed description of the present invention, there is illustrated in perspective view FIGS. 1 and 2 and in cross-section in FIGS. 3 and 4 photonics package 10 constructed in accordance with the present invention. The package consists of a housing 12 having a rear wall 14, a front wall 16, a top wall 18, sidewalls 20 and 22, and a bottom wall 24. Secured to the front wall 16 is a first closure, which cover an aperture 28 (see FIG. 3) in the front wall, with the first closure 26 incorporating a fiber alignment window 30 for receiving and securing an optical fiber assembly generally indicated at 32.

The top wall 18 includes a viewing aperture 34 which is closed by a second closure 36, the viewing aperture being located to permit access to the interior of the housing during assembly of the photonic package.

Mounted on the interior surface 40 of rear wall 14 is an MMIC chip 42 which may be mounted on a chip carrier, or platform, 44 in a known manner, with the platform 44 being secured to rear wall surface 40, also in known manner. The chip 42, which includes a photodetector, is mounted and positioned on the rear wall 14 so that the photosensitive surface of the detector is in general alignment with the center of fiber alignment window 30 formed in first closure 26, when the first closure is in place over aperture 28. This general alignment serves to position the photodetector of chip 42 in general axial alignment with an optical fiber (to be described) included as a part of assembly 32. The MMIC photodetector chip 42 also may include other circuitry; for example, it may incorporate a radio frequency (RF) amplifier having its input connected to the photodetector and having its output connected through wall 14 to high frequency connector 26, in conventional manner. In addition, the rear wall 14 may also carry a connector pin 48 for supplying a DC bias voltage to the package 10 for operation of the integrated circuits on chip 42, again in known manner. The package 10 is hermetically sealed, and preferably includes suitable mounting devices such as mounting tabs 50 and 52.

To assemble the photonics package 10, the various electronic components, including the MMIC chip 42, are mounted on the rear wall 40 of the housing through the aperture 28, and the electrical connections between the chip and the RF connector 46 and the DC power supply 48 are made in conventional manner, these interconnections not being a part of the present invention. Upon completion of the placement and connection of the electrical components, the aperture 28 of the housing is closed by positioning the first closure 26 in the aperture and then hermetically sealing it by laser welding, indicated at 60 FIG. 4. As described above, the closure 26 includes a fiber alignment window 30, which preferably is aligned with the photosensitive surface of chip 42 along a common center line, or axis 62, to ensure proper alignment of the fiber assembly 32 with the photodetector chip 42.

To fabricate the fiber assembly 32, in its preferred form, a cylindrical ferrule 64, which preferably is metal, is placed over, and coaxially surrounds, an end portion 66 of an optical fiber 68 which includes a jacket 70 in conventional manner. The ferrule extends along the outside of the jacketed fiber, and the jacket and the ferrule terminate near the distal end 72 of the fiber 68 to leave a short length of the fiber 68 free. The upper end of the ferrule is then secured to the outside of jacket 70, as by epoxy staking, indicated at 74 in FIGS. 3 and 4. Solder or cold welding is used to hermetically seal the joint between the ferrule and the distal end 72 of the fiber, as illustrated at 76, also in FIGS. 3 and 4.

The ferrule and the enclosed optical fiber are next positioned in an elongated, generally cylindrical flange 80, with an inner diameter 86 of the flange being slightly larger than the outer diameter of the ferrule 64 to permit easy insertion of the ferrule and to allow it to be properly positioned longitudinally within the flange, the optical fiber assembly 32. The flange is then positioned on the outer surface 82 of first closure 26 in general alignment with fiber alianment window 30 and axis 62, with the ferrule extending through the flange into the window 30, as illustrated in FIG. 4. Preferably, the diameter of window 30 is greater than the diameter of the ferrule 64 to allow the optical fiber assembly 32 to move laterally in the window, with the relative diameters of the ferrule and the window limiting that motion.

The flange 80 preferably includes an enlarged base 84 which contacts the surface 82 of first closure 26 and is sufficiently large to ensure that the fiber alignment window 30 remains covered by the flange 80 while the optical fiber assembly 32 is moved laterally within the fiber alignment window 30 to permit a rough alignment of the assembly 32 with the photodetector 42. The flange can then be secured to the surface 82 of first closure 26, for example by a conventional laser fillet weld. In accordance with a preferred form of the invention, a circumferential groove 88 surrounds the peripheral edge of fiber alignment window 30 and is closely spaced thereto, with the groove containing a slow-setting or slow-curing sealing material 90 which preferably is a material such as solder, and which is activated to hermetically seal flange 80 to the first closure 26, as will be described.

After the optical fiber assembly 32 is positioned on the lid 26, the assembly is shifted laterally and the optical fiber 68 with the ferrule 64 are moved inwardly or outwardly through the flange to coarsely align with the photodetector 42 and space it slightly above the light sensing surface of the photodetector. An optical camera or a CCD camera may be used to view the interior of the housing 12 through viewing aperture 34 to assist in this alignment. Such a camera is diagrammatically illustrated at 92 in FIG. 3. If desired, an automatic active alignment control system, generally indicated at 94 in FIG. 3, may be utilized to operate conventional pneumatic tweezers, indicated at 96, for manipulating the optical fiber assembly. These tweezers are used to adjust the location of the ferrule 64 within the flange 80 by moving the ferrule longitudinally inwardly and outwardly with respect to the housing to adjust the spacing between the end 72 of the fiber 68 and the surface of photodetector 42, and by shifting the entire assembly 32 laterally in the window 30 to align the fiber with the center line 62 and the photosensitive surface of the photodetector.

When the end 72 of the fiber 68 is spaced apart from the surface of the photodetector 42 by the desired amount, the ferrule 64 is spot welded and then ring welded to the upper end of the flange 80, as illustrated at 100 in FIG. 4, to produce a hermetic seal between the ferrule and the interior of the flange 80. The fiber optic assembly 32 is then laterally aligned with the photodetector 42, and the base 84 of the flange 80 is hermetically sealed to the surface 82 of the first closure 26 by heating the solder 90 in groove 88 by hot gas injection or laser soldering, in accordance with the preferred form of the invention. In this process, a non-eutectic solder such as Sn or SnAg (93/7), having a liquid temperature which is far higher than its solid temperature, is heated to is liquid temperature and then allowed to cool. As the solder cools, the optical fiber assembly 32 is realigned as necessary, by using the tweezer 96, to shift it laterally for example, so as to maintain a maximum light signal coupling between the optical fiber and the photodetector. The solidified solder secures the optical fiber assembly 32 in place and hermetically seals the fiber alignment window 30. Finally, the second closure 36 is laser welded to the housing wall 18, as indicated at 102 in FIG. 4, completing the hermetic sealing of the housing to provide a sealed photonic package.

Although the present invention has been described in terms of a preferred embodiment, it will be understood that numerous variations and modifications may be made without departing from the invention. Thus, for example, the housing can take numerous shapes other than the generally rectangular shape illustrated, and the optical fiber assembly may differ in material and shape from those illustrated while still permitting longitudinal and lateral alignment for accurate positioning of the output end of the fiber with respect to the photodiode and for permitting final adjustment as the seal solidifies. Such variations and modifications may be made without departing from the true spirit and scope of the invention as set forth in the following claims.

What is claimed is:

1. A process for fabricating a photonics package comprising:
   positioning and securing a photodetector on a first wall of a housing in alignment with and opposite to an aperture in a second wall of the housing;
   securing, as by laser welding, a first closure over the aperture, the first closure including a window aligned with the photodetector;
   enclosing a portion of an optical fiber in a ferrule; inserting an end portion of the optical fiber enclosed in the ferrule through a flange and through the window into the housing with the flange abutting the first closure and covering the window;
   determining the relative location of the optical fiber with resoect to the photodetector through a viewing aperture in the housing;
   laterally adjusting the position of the flange on the first closure as needed to alien the optical fiber with the photodetector;
   longitudinally adiusting the location of the ferrule within the flange as needed to adjust the spacing between the optical fiber and the photodetector;
   welding the ferrule to the flange;
   initially laser welding the flange to the housing;
   activating a settable sealing material for hermetically sealing the flange to the housing;
   adjusting the position of the flange on the housing and further laser welding the flange as the sealing material sets to accurately position the optical fiber with respect to the photodectector; and
   securing a second closure over the viewing aperture.

2. The process of claim 1, wherein the step of enclosing the optical fiber in the ferrule further includes, securing a ferrule to the optical fiber by staking a first end of the ferrule to an optical fiber jacket, and hermetically sealing a second end of the ferrule to the optical fiber.

3. The process of claim 2, wherein welding the ferrule to the flange includes ring welding.

4. A process for fabricating an optical fiber assembly for a photonics package comprising:
   positioning a photodetector in a housing;
   securing a cylindrical, elongated ferrule coaxially around a jacketed optical fiber;
   exposing the distal end of the fiber;
   adjustably positioning the ferrule coaxially within a cylindrical flange;
   securing the ferrule within the flange;
   inserting the distal end of the fiber into the housing through a fiber alignment window;
   initially welding the flange to the housing;
   activating a settable sealing material in a groove on the housing for hermetically sealing the flange to the housing; and
   adjusting the position of the flange on the housing while the sealing material sets to seal the flange to the housing and to accurately position the optical fiber with resepect to the photodetector.

5. A photonics package including:
   a housing including spaced front and back walls;
   an apeture in said front wall;
   a photosensitive element mounted on said back wall within the housing and in alignment with said aperture,
   a first closure for said aperture;
   a fiber alignment window in said first closure opposite said photosensitive element;
   a viewing aperture in said housing providing access to the interior of said housing during assembly of said photonics package;
   a fiber optic assembly including an optical fiber, a ferrule coaxial with and surronding said optical fiber, and a cylindrical flange receiving said ferrule, said assembly being locatd so that said fiber extends through said alignment window into said housing and with said flange abutting said front wall and covering said window, said flange being laterally adjustable with respect to said window and with respect to said photosensitive element and intially secured to said front wall via welding;
   a groove located on said front wall adjacent said alignment window, said groove containing a settable sealing material; and
   said flange being hermetically sealed to said front wall by said settable material and further laser welded to secure said optical fiber to allow alignment of said optical fiber while said material is setting to position said optical fiber in said fiber alignment window and to align the distal end of the fiber with said photosensitive elelment.

6. The photonics package of claim 5, wherein said settable material is solder.

7. The photonics package of claim 5, wherein said viewing aperture is sealed by a second closure following the assembly of said photonics package.

* * * * *